(12) United States Patent
Shigetomi et al.

(10) Patent No.: US 6,510,125 B1
(45) Date of Patent: Jan. 21, 2003

(54) STORAGE MEDIUM HAVING ELECTRONIC CIRCUIT, APPARATUS COMMUNICATING INFORMATION WITH THE ELECTRONIC CIRCUIT, AND SYSTEM INCLUDING THEM

(75) Inventors: Takashi Shigetomi, Miyagi-ken (JP); Tetsuo Saito, Miyagi-ken (JP); Tsunematsu Komaki, Tokyo (JP)

(73) Assignee: Kabushiki Kaisha OPTROM, Miyagi-ken (JP)

( * ) Notice: Subject to any disclaimer, the term of this patent is extended or adjusted under 35 U.S.C. 154(b) by 0 days.

(21) Appl. No.: 09/171,082

(22) PCT Filed: Jun. 18, 1998

(86) PCT No.: PCT/JP98/02704

§ 371 (c)(1),
(2), (4) Date: Oct. 13, 1998

(87) PCT Pub. No.: WO98/58377

PCT Pub. Date: Dec. 23, 1998

(30) Foreign Application Priority Data

Jun. 19, 1997 (JP) .............................. 9-163136
Apr. 9, 1998 (JP) ............................ 10-097869

(51) Int. Cl.[7] .......................... G11B 20/00; G11B 23/00; G11B 7/24; H01Q 1/00
(52) U.S. Cl. ....................... 369/273; 343/720; 343/740; 343/766; 343/700 MS; 360/135
(58) Field of Search ................................. 369/273, 291, 369/272; 360/131, 135; 343/720, 726, 727, 728, 729, 730, 739, 740, 763, 764, 766, 799, 866, 869, 870, 895, 700 MS

(56) References Cited

U.S. PATENT DOCUMENTS 3,634,789 A * 1/1972 Stuckert ...................... 333/238
3,956,751 A * 5/1976 Herman ...................... 343/744

(List continued on next page.)

FOREIGN PATENT DOCUMENTS

DE 2607634 A * 9/1977 .............. H01P/5/08
DE 196 07 169  11/1996  6/1993

(List continued on next page.)

OTHER PUBLICATIONS

"Magnetic Recording Disk With Silicon Substrate Disk Containing Both Integrated Electronic Circuits and Magnetic Media" IBM Technical Disclosure Bulletin, vol. 28, No. 7, Dec. 1985, pp. 2861–2862, XP002073271 New York, US.

(List continued on next page.)

Primary Examiner—William Klimowicz
(74) Attorney, Agent, or Firm—Merchant & Gould P.C.

(57) ABSTRACT

The present invention provides a storage medium having intelligence that has, in one-piece, a storage medium and an electronic circuit, and has communication structure with an external apparatus to reduce loads of a main-frame of a system, and that can further manage and control external system equipment, the apparatus communicating information with the electronic circuit, and a system including them. The electronic circuit mounted on the intelligent disk 2 has a contact type or a non-contact type interface as communication structure. The contact type interface is connected to an external contact electrically and/or mechanically. The non-contact type interface is connected to an external interface via sound, light, radio waves, or induction. The non-contact type, a plurality of balanced microstrip lines are formed on a rotating medium and a fixed body in concentric circles, they are located so that respective balanced microstrip lines face. The centers of respective balanced microstrip lines coincide with the center of the rotating shaft so that the balanced microstrip lines of the rotating medium and fixed body respectively keep to face each other in the one-to-one manner, even during the rotating medium rotating.

16 Claims, 13 Drawing Sheets

U.S. PATENT DOCUMENTS

| | | | |
|---|---|---|---|
| 4,338,644 A | | 7/1982 | Starr |
| 4,528,524 A | * | 7/1985 | Bert .................. 331/117 D |
| 4,814,924 A | | 3/1989 | Ozeki |
| 4,827,271 A | * | 5/1989 | Berneking et al. ... 343/700 MS |
| 4,839,875 A | | 6/1989 | Kuriyama et al. |
| 4,868,373 A | | 9/1989 | Opheij et al. |
| 4,960,982 A | | 10/1990 | Takahira |
| 5,036,461 A | | 7/1991 | Elliott et al. |
| 5,119,353 A | | 6/1992 | Asakura |
| 5,159,182 A | | 10/1992 | Eisele |
| 5,235,586 A | | 8/1993 | Feamster et al. |
| 5,276,572 A | | 1/1994 | Kinoshita et al. |
| 5,289,521 A | | 2/1994 | Coleman et al. |
| 5,423,054 A | | 6/1995 | Schmidt et al. |
| 5,533,125 A | | 7/1996 | Bensimon et al. |
| 5,546,585 A | | 8/1996 | Soga |
| 5,559,927 A | | 9/1996 | Clynes |
| 5,559,958 A | | 9/1996 | Farrand et al. |
| 5,584,043 A | | 12/1996 | Burkart |
| 5,634,111 A | | 5/1997 | Oeda et al. |
| 5,652,838 A | | 7/1997 | Lovett et al. |
| 5,663,553 A | | 9/1997 | Aucsmith |
| 5,734,787 A | | 3/1998 | Yonemitsu et al. |
| 5,737,549 A | | 4/1998 | Hersch et al. |
| RE35,839 E | | 7/1998 | Asai et al. |
| 5,790,489 A | * | 8/1998 | O'Connor .................. 360/60 |
| 5,793,714 A | | 8/1998 | Inoue et al. |
| 5,802,519 A | | 9/1998 | De Jong |
| 5,844,218 A | | 12/1998 | Kawan et al. |
| 5,856,659 A | | 1/1999 | Drupsteen et al. |
| 5,857,079 A | | 1/1999 | Claus et al. |
| 5,878,282 A | | 3/1999 | Mital |
| 5,889,657 A | | 3/1999 | Kono |
| 5,890,014 A | | 3/1999 | Long |
| 5,903,867 A | | 5/1999 | Watari et al. |
| 5,920,733 A | | 7/1999 | Rao |
| 5,930,823 A | | 7/1999 | Ito et al. |
| 5,936,226 A | | 8/1999 | Aucsmith |
| 5,936,594 A | * | 8/1999 | Yu et al. .................. 343/895 |
| 5,940,363 A | | 8/1999 | Ro et al. |
| 5,951,687 A | | 9/1999 | Chan et al. |
| 5,999,698 A | | 12/1999 | Nakai et al. |
| 6,005,940 A | | 12/1999 | Kulinets |
| 6,021,306 A | | 2/2000 | McTaggart |
| 6,029,887 A | | 2/2000 | Furuhashi et al. |
| 6,044,046 A | | 3/2000 | Diezmann et al. |
| 6,164,241 A | * | 12/2000 | Chen et al. .............. 118/723 I |
| 6,295,564 B1 | * | 9/2001 | Shigetomi et al. .......... 235/492 |

FOREIGN PATENT DOCUMENTS

| | | | | |
|---|---|---|---|---|
| EP | 0 190 733 | 8/1986 | | |
| EP | 0 193 635 | 9/1986 | | |
| EP | 0 394 098 | 10/1990 | | |
| EP | 0 545 532 | 6/1993 | | |
| EP | 0 662 674 | 7/1995 | | |
| EP | 0 756 274 | 1/1997 | | |
| EP | 0 809 245 | 11/1997 | | |
| JP | 55038706 A | * 3/1980 | .......... H01Q/13/08 |
| JP | 61-286927 | 12/1986 | | |
| JP | 63-2130 | 1/1988 | | |
| JP | 63-7541 | 1/1988 | | |
| JP | 63-25791 | 2/1988 | | |
| JP | 63-25792 | 2/1988 | | |
| JP | 63-217569 | 9/1988 | | |
| JP | 1-127392 | 5/1989 | | |
| JP | 1-162286 | 6/1989 | | |
| JP | 1-263892 | 10/1989 | | |
| JP | 2-3132 | 1/1990 | | |
| JP | 2-5158 | 1/1990 | | |
| JP | 3-73481 | 3/1991 | | |
| JP | 04304001 A | * 10/1992 | ............. H01P/1/06 |
| JP | 4-304011 | 10/1992 | | |
| JP | 4-355818 | 12/1992 | | |
| JP | 4-356785 | 12/1992 | | |
| JP | 5-54460 | 3/1993 | | |
| JP | 5-258347 | 10/1993 | | |
| JP | 5-282771 | 10/1993 | | |
| JP | 6-36305 | 5/1994 | | |
| JP | 6-139747 | 5/1994 | | |
| JP | 6-295200 | 10/1994 | | |
| JP | 06309840 A | * 11/1994 | .......... G11B/23/30 |
| JP | 7-334637 | 12/1995 | | |
| JP | 8-123635 | 5/1996 | | |
| JP | 8-161790 | 6/1996 | | |
| JP | 9-34491 | 2/1997 | | |
| JP | 10083657 A | * 3/1998 | .......... G11B/27/00 |
| JP | 11161551 A | * 6/1999 | .......... G06F/12/14 |
| JP | 2000132945 A | * 5/2000 | .......... G11B/23/30 |
| TW | 289190 | 10/1996 | | |
| TW | 374913 | 11/1999 | | |
| WO | 96/29699 | 9/1996 | | |

OTHER PUBLICATIONS

IBM Journal TDB, Jun. 1992, pp. 311–314.
Patent Abstract of Japan vol. 012, No. 140 (P–696), Apr. 28, 1988 for JP 62–262289A, Nov. 14, 1987.
Patent Abstract of Japan vol. 097, No. 005, May 30, 1997 & JP 09–017154A, Jan. 17, 1997.
Patent Abstract of Japan (JPA 09–245381).
Patent Abstract of Japan vol. 033 (P–334), Feb. 13, 1985 & JP59–175062A, Oct. 3, 1984.
International Search Report (in Japanese) for application PCT/JP98/02704, dated Sep. 16, 1998.

* cited by examiner

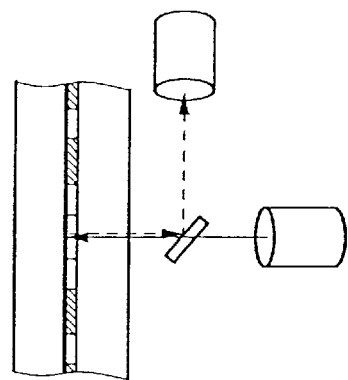
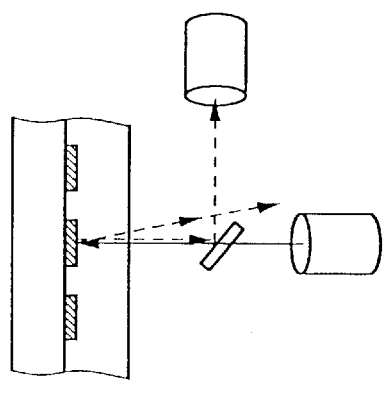
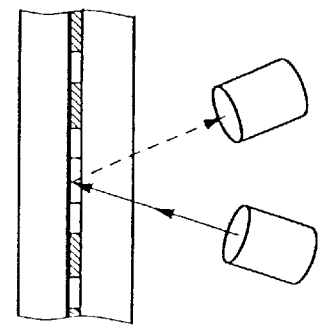
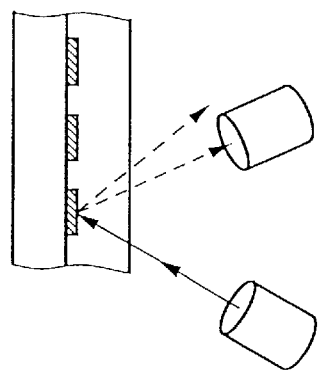
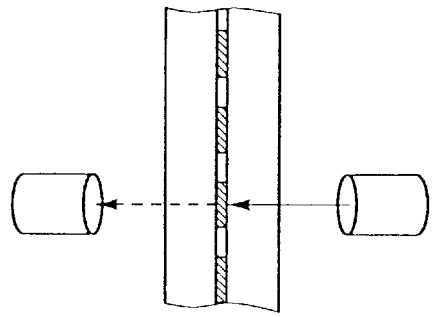
FIG. 7A
FIG. 7B

STORAGE MEDIUM HAVING ELECTRONIC CIRCUIT, APPARATUS COMMUNICATING INFORMATION WITH THE ELECTRONIC CIRCUIT, AND SYSTEM INCLUDING THEM

TECHNICAL FIELD

The present invention relates to an intelligent storage medium and an interfacing method thereof. In particular, the present invention relates to a non-contact type of rotating medium, a signal transmission method of the non-contact type of rotating medium, and signal transmission means and an apparatus thereof, for example, an antenna system of a radio communication instrument. Therefore, the present invention is suitable to use in data communication with a general rotating medium in the state of non-contact, and in particular, to use in the non-contact type of data communication between a microprocessor and the like on the rotating medium and the external apparatus in case the microprocessor and the like are mounted on the rotating medium such as an optical disk and the like that are storage media.

BACKGROUND ART

Up to now, as information storage media, magnetic disks, magnetic disk cards, and the like as information storage media magnetically recording information, optical disks, optical cards, and the like as information storage media optically recording information, magneto-optical disks, magneto-optical cards, and the like as information storage media that are devised by mixing both technologies are well-kown, and are already in practical use.

The important part of these conventional information storage media is to record information, and hence research and development from the viewpoint of miniaturizition and large capacity have proceeded in this direction. Consequently, capacity of recorded information has increased, year after year, owing to a high-density recording method in the width or pitch direction, a recording method using multiple layers, and the like.

Nevertheless, in regard to physical or logical recording methods and foirmats that are used for writing information on information storage media, therefore kinds of information written beforehand on information storage media, or the like, and therefore methods where each operator judges them by matching an indication on a case of an information storage medium and the like, or each information recording apparatus reads information on an information storage medium and a system judges or recognizes them.

In addition, as information storage apparatus reading and writing information from/to various types of information storage media, various apparatuses have been developed and produced. Nevertheless, since compatibility between manufacturers or upward compatibility between media is not complete, users must bear a heavy load.

Furthermore, hereinafter, when systems having various types of OSs and application programs are down-loaded into standardized system devices, such as when use of network computers (NCs) become widespread, there is a need to simplify OSs and application programs as much as possible.

Contacts are frequently used for signal transmission between the rotating medium and external equipment Although there are technologies recently developed for non-contact types of cards for non-contact signal transmission, they are not multiple channels devices, and hence they are not suitable to super high-speed signal transmission, i.e. 10's of MBPS. As an example for realizing super high-speed signal transmission, a method using microstrip lines is proposed (Japanese Patent application Laid-open No. 4-304001).

Nevertheless, the communication method using the microstrip lines has large electromagnetic leakage in the surface direction due to the characteristic of the microstrip lines. Therefore, since a transmitted signal is mixed, to a considerable extent, with adjacent lines as interfering waves, this is not efficient and is disadvantageous from the viewpoint of packaging density if many lines are located on the sane surface. Furthermore, it is complicated in construction and expensive to locate lines vertically as described in Japanese Patent application Laid-opened No. 4-304001.

DISCLOSURE OF INVENTION

The present invention considers the above viewpoints and provides: a storage medium having intelligence that has, in one-piece, a storage medium, and an electronic circuit suitable to the storage medium, and has communication means, with an external apparatus, to reduce the loads of a main frame of a system in processing of information stored in the information storage medium, said electronic circuit can manage and control the external system equipment; the apparatus exchanging information with the electronic circuit; and a system including them.

In order to solve this task, a storage medium of the present invention is a storage medium that has an electronic circuit mounted on at least a part of the storage medium, wherein the electronic circuit has communication means for communicating with the outside and the communication means has an interface including a contact type or a non-contact type interface.

Here, the non-contact type interface is communicating with an external interface via sound, light, radio waves, or induction. In addition, the interface via radio waves or induction is provided on a margin of the storage medium in correspondence to a communication frequency. Furthermore, the interface via light is provided on a margin of the storage medium in corresponding to an optical communication frequency or is constructed so that the path of the light from the outside may be changed by the optical path-change members and driving the members according to output information. Moreover, the optical path-change members are elements for changing a light path, that is, transmitting or shielding light. In addition, optical path-change members are elements for changing the light path by using the reflection angle. Furthermore, the contact type interface is connected to an external interface electrically and/or mechanically. Moreover, the electrical and/or mechanical contact is provided on a margin of the storage medium with at least supply means of a reference clock and electric power. In addition, the interface is an interface that is standardized beforehand physically and/or logically. Furthermore, the storage medium includes a magnetic disk, a magnetic card, an optical disk such as a CD and a DVD, a recordable/reproducible optical disk including a magneto-optical disk such as an MO, an optical card, or a magneto-optical card.

Moreover, an apparatus of the present invention is an apparatus performing information transfer with an electronic circuit of a storage medium that has the electronic circuit mounted on at least a part of the storage medium, wherein the electronic circuit has communication means for communicating with the outside and said apparatus has an interface, including a contact type or a non-contact type interface, with the communication means.

The non-contact type interface is communicating with an external interface via sound, light, radio waves, or induction. In addition, the interface via radio waves or induction is provided on a margin of the storage medium in correspondence to a communication frequency. Furthermore, the interface via light is provided on a margin of the storage medium in corresponding to an optical communication frequency or is constructed so that a path of light from the outside may be changed by locating the optical path-change members and driving the members according to output information. Moreover, the optical path-change members change the light path, that is, by transmitting or shielding light. In addition, optical path-change members change the light path by using the reflection angle. Furthermore, the contact type interface is connected to an external interface electrically and/or mechanically. Moreover, the electrical and/or mechanical contact is provided on a margin of the storage medium with at least supply means of a reference frequency clock and electric power. In addition, the interface is an interface that is standardized beforehand, physically and/or logically. Furthermore, the storage medium includes a magnetic disk, a magnetic card, an optical disk such as a CD and a DVD, a recordable/reproducible optical disk including a magneto-optical disk such as an MO, an optical card, or a magneto-optical card.

In addition, a system of the present invention is a system composed of a storage medium, which has an electronic circuit mounted on at least a part of the storage medium, and an apparatus performing information transfer with the electronic circuit, wherein the electronic circuit has communication means for communicating with the outside and the communication means and apparatus have an interface, including a contact type or a non-contact type interface.

Here, the non-contact type interface communicates with an external interface via sound, light, radio waves, or induction. In addition, the interface via radio waves or induction is provided on a margin of the storage medium in correspondence to a communication frequency. Furthermore, the interface via light is provided on a margin of the storage medium in corresponding to an optical communication frequency or is constructed so that the path of light from the outside may be changed by locating optical path-change members and driving the members according to output information. Moreover, the optical path-change change the light path, that is, transmitting or shielding light. In addition, optical path-change members change the light path by using a reflection angle. Furthermore, the contact type of contact is connected to an external interface electrically and/or mechanically. Moreover, the electrical and/or mechanical contact is provided on a margin of the storage medium with at least supply means of a reference frequency clock and electric power. In addition, the interface is an interface that is standardized beforehand, physically and/or logically. Furthermore, the storage medium includes a magnetic disk, a magnetic card, an optical disk such as a CD and a DVD, a recordable/reproducible optical disk including a magneto-optical disk such as an MO, an optical card, or an magneto-optical card.

The present invention can provide: a storage medium having intelligence that has in one-piece a storage medium, and an electronic circuit suitable to the storage medium, and has communication means with an external apparatus to reduce loads of a main-frame of a system in processing of information stored in the information storage medium, and that can manage and control external system equipment; an apparatus exchanging information with the electronic circuit; and a system including them.

In addition, the present invention provides: a non-contact type of rotating medium where transmission signals mixing of adjacent lines resulting in interfering waves are reduced, many lines can be efficiently located on the same surface, and hence packaging density can be increased at low cost; a signal transmission method thereof; and signal transmission means and an apparatus thereof.

In order to solve this task, a radio signal transmission apparatus comprises a first plurality of balanced microstrip lines formed in concentric circles centering on a rotating shaft in predetermined intervals on the same surface of a flat rotating medium, a second plurality of balanced microstrip lines that face the first plurality of balanced microstrip lines on the rotating medium at a predetermined gap, in a plane facing and fixed at the same intervals and radii as those of the first plurality of balanced microstrip lines on the rotating medium. Furthermore, the radio signal transmission apparatus is characterized in that the apparatus performs a plurality of signal transmission corresponding to the number of magnetic couplings by using magnetic coupling between the first balanced microstrip lines on the rotating medium and the fixed second balanced microstrip lines corresponding to each other in a one-to-one manner.

In addition, a radio signal transmission apparatus is characterized in that balanced microstrip lines are used as an antenna of a radio block so as to avoid interference with adjacent lines and to increase density of signal transmission channels of signal transmission lines on the same surface.

Here, a transmitter and/or a receiver, and termination resistors are connected at both ends of each of the balanced microstrip lines on the rotating medium and the fixed balanced microstrip lines. The connection ends of the transmitter and/or receiver, and termination resistors are selected so that inductive directions on the both balanced microstrip lines coincide. Furthermore, fixed or variable phasers adjusting electrical line length are further provided at the midpoints of the balanced microstrip lines.

Moreover, a radio signal transmission method of the present invention uses a flat rotating medium on which a plurality of balanced microstrip lines are formed in concentric circles centering on rotating shaft at predetermined intervals on the same surface, and an external apparatus having a plurality of balanced microstrip lines that face the plurality of balanced microstrip lines on the rotating medium at a predetermined gap in the plane facing and fixed in the same intervals and radii as those of the plurality of balanced microstrip lines on the rotating medium. Furthermore, the method is characterized in that a plurality of signal transmission corresponding to the number of magnetic couplings by using magnetic coupling between the balanced microstrip lines on the rotating medium and the fixed balanced microstrip lines that corresponds to each other in a one-to-one manner.

Here, a transmitter and/or a receiver, and termination resistors are connected at both ends of each of the balanced microstrip lines on the rotating medium and the fixed balanced microstrip lines so that inductive directions on balanced microstrip lines may coincide. Furthermore, fixed or variable phasers adjusting electrical line lengths are provided at the midpoints of the balanced microstrip lines.

In addition, a non-contact type of rotating medium has communication means, wherein a plurality of balanced microstrip lines are formed in concentric circles centering on a rotating shaft in predetermined intervals on the same surface of the flat rotating medium as a part of an antenna.

Here, a transmitter and/or a receiver, and a termination resistor are connected at both ends of the balanced microstrip lines. Furthermore, fixed or variable phasers adjusting electrical line lengths are provided at the midpoints of the balanced microstrip lines. Moreover, the non-contact type of rotating medium is a storage medium having an electronic circuit.

In addition, an information processing apparatus can communicate with a non-contact type of rotating medium having communication means. The apparatus is characterized in that, if the non-contact type of rotating medium has a plurality of balanced microstrip lines formed in concentric circles centering on a rotating shaft in predetermined intervals on the same surface, the apparatus has a plurality of balanced microstrip lines that face the plurality of balanced microstrip lines on the rotating medium in a predetermined gap in plane facing and are fixed in the same intervals and radii as those of the plurality of balanced microstrip lines on the rotating medium. Furthermore, the apparatus is characterized in that the apparatus performs a plurality of signal transmission corresponding to the number of magnetic couplings by using magnetic coupling between the balanced microstrip lines on the rotating medium and the fixed balanced microstrip lines that corresponds to each other in a one-to-one manner.

Here, a transmitter and/or a receiver, and termination resistors are connected at both ends of the fixed balanced microstrip lines so that inductive directions on balanced microstrip lines may coincide. Furthermore, fixed or variable phasers adjusting electrical line lengths are provided at the midpoints of the balanced microstrip lines.

The present invention can form many lines on the same surface in comparison to microstrip lines since leakage of an electromagnetic field in the surface direction is small by constructing antenna lines with balanced microstrip lines, and hence more channels of signal transmission becomes possible and its construction is simple. Hence, the present invention can provide a non-contact type of rotating medium and a signal transmission method for the non-contact type of rotating medium, and signal transmission means and an apparatus thereof.

BRIEF DESCRIPTION OF DRAWINGS

FIGS. 7A and 7B are drawings of an operation of the elements for changing paths;

BEST MODE FOR CARRYING OUT THE INVENTION

For more detailed description of the present invention, embodiments of the present invention will be described with reference to attached drawings.

<Constructive Example of System Including Storage Medium of this Embodiment>

Figure 1:
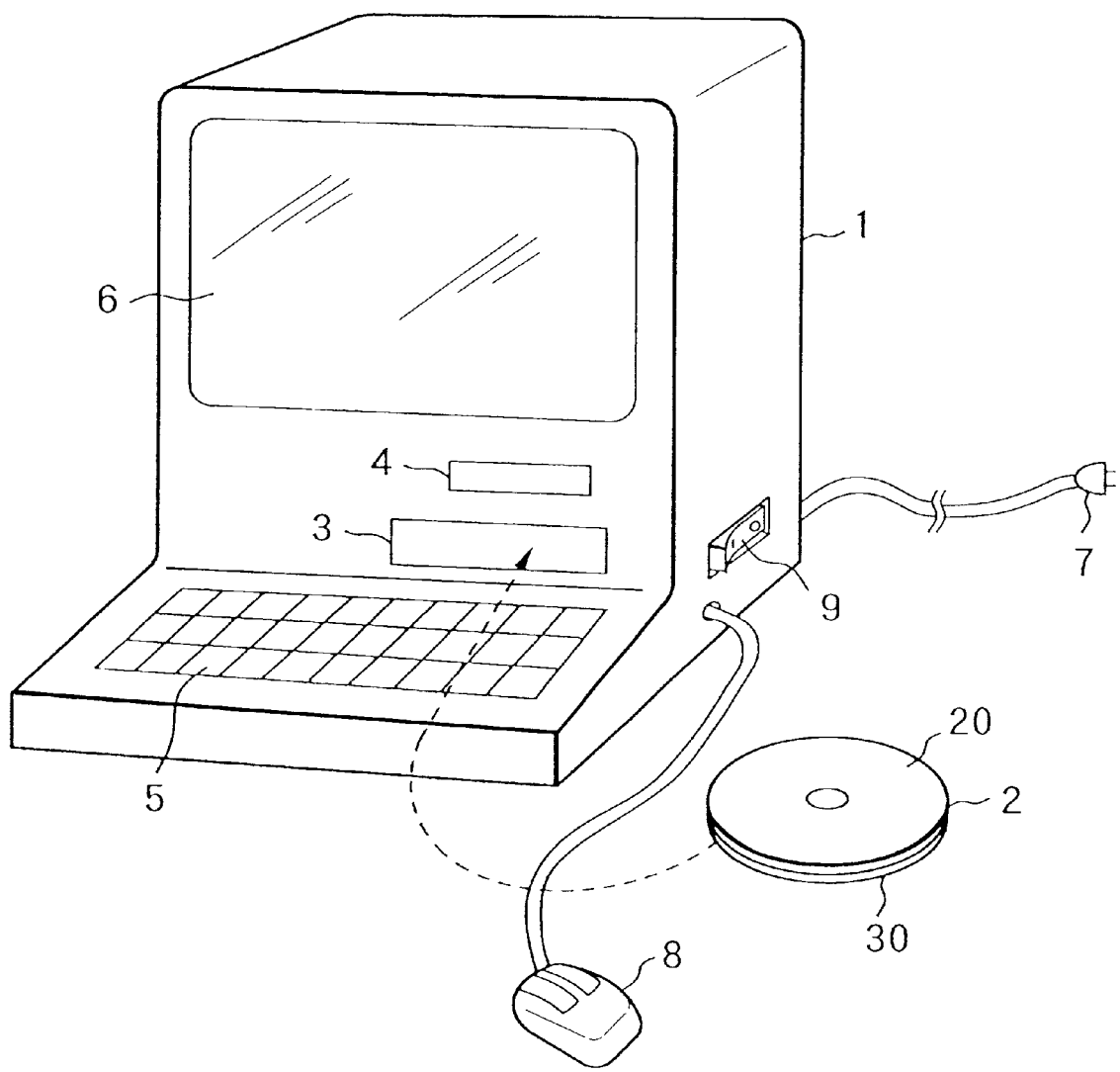
FIG. 1 is an explanatory drawing of an example of a storage medium system according to this embodiment.

FIG. 1 is an explanatory diagram showing an example using a storage medium system (for example, a personal computer) according to this embodiment.

Hereinafter, although this embodiment will be described by exemplifying a digital video disk (hereinafter, DVD), it is apparent that the present invention is applicable to other detachable storage media and fixed storage media such as a magnetic disk, and exhibits similar effects in these storage media. In addition, although a personal computer is shown in drawings as a main-frame of a system, any device using a storage medium such as a TV set, a video recorder, a stereo tape recorder, a game machine, a communication instrument, and manufacturing equipment can be used.

For example, it is conceivable that an electronic circuit of an intelligent disk (hereinafter, this is called an ID) of this embodiment is used as a supplement to a main-frame of the system in a video recorder, stereo tape recorder, and the like, and that the electronic circuit of the ID of this embodiment is used as a main controller of the system in the game machine, manufacturing equipment, or the like.

In FIG. 1, numeral 1 shows a personal computer system having a display unit 6, a keyboard 5, a mouse 8, a floppy disk controller 4, an optical disk controller 3, and the like, and numeral 2 shows an ID of this embodiment and comprises an electronic-circuit-mounting surface 20 and an information recording surface 30. Numeral 3 shows an optical disk controller driving the ID and performing read/write. If the ID 2, of this embodiment is mounted, the optical disk controller 3 interfaces with the electronic-circuit-mounting surface 20 in addition to read/write information from the information recording surface 30. In this embodiment, if a conventional DVD is mounted, this controller operates as a conventional optical disk controller. For this judgment, hardware difference can be provided on DVDs, or type information can be stored at a first readout position of the information recording surface 30. Numeral 4 is the floppy disk controller, 5 is the keyboard, 6 is the display unit such as a CRT and LCD, 7 is an AC input plug, 8 is the mouse, and 9 is a power switch.

<Constructive Example of ID According to this Embodiment>

Figure 2:
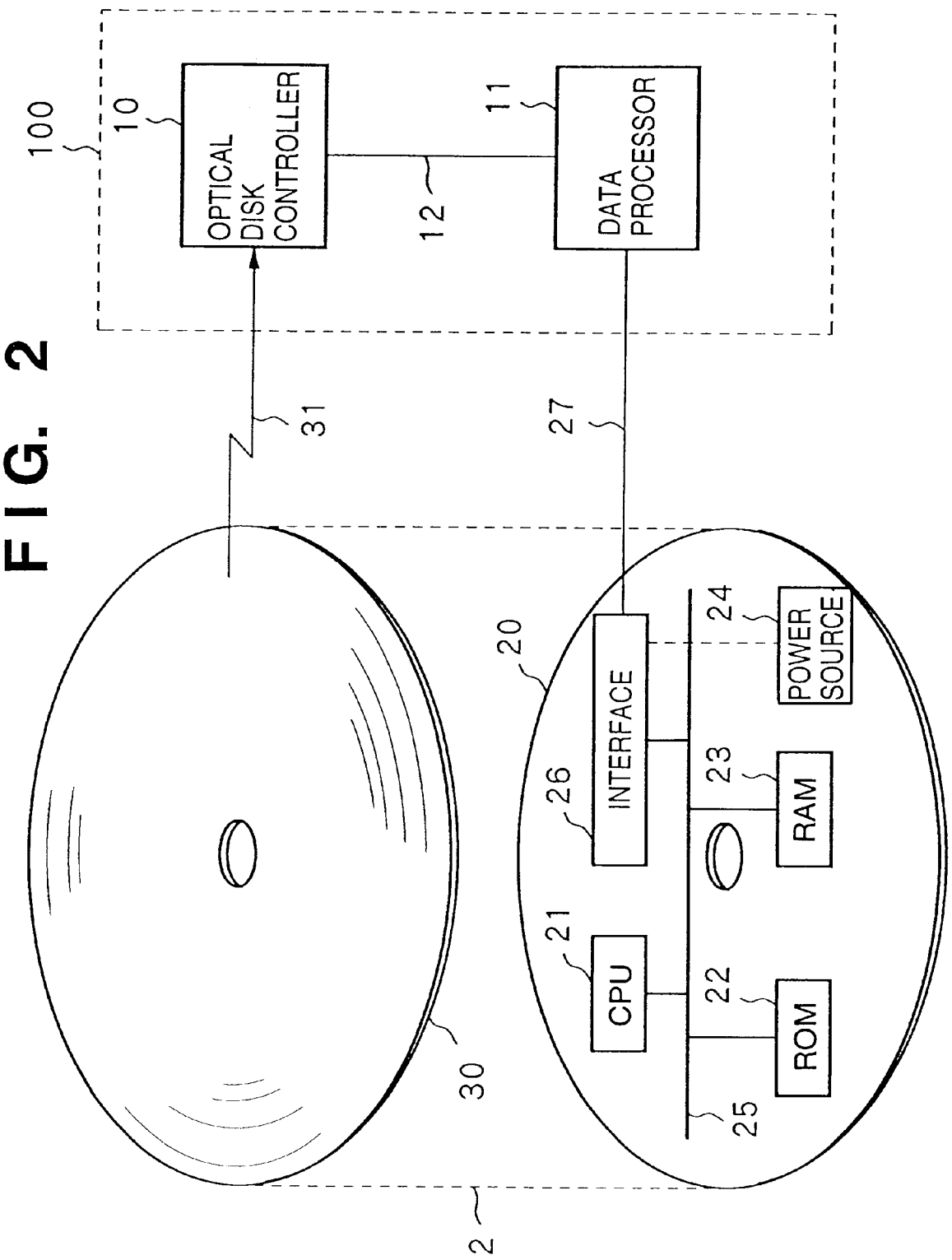
FIG. 2 is an explanatory drawing of a constructive example of an ID that is this embodiment.

FIG. 2 is an explanatory diagram of a constructive example of the ID 2 of this embodiment.

As shown in FIG. 2, the ID 2 is composed of the electronic-circuit-mounting surface 20 and information recording surface 30. On the electronic-circuit-mounting surface 20, a CPU 21, ROM 22, RAM 23, and an interface 26 are mounted as a control block, and the power source 24 supplies power to each electronic circuit.

(Electronic Circuit)

Although the electronic circuit mounted on the electronic-circuit-mounting surface is shown in FIG. 2 as if the electronic circuit is composed by mounting functionally discrete parts and elements, the electronic elements can be mounted on an insulating substrate such as a printed circuit board or a ceramic substrate. In addition, each circuit can be combination of logic elements, a gate array, a one chip, SOC (system on chip), or the like. In addition, each circuit can be a semiconductor circuit formed on a silicon substrate, a ceramic substrate, or an insulating substrate. Furthermore, each circuit can be formed by building up these semiconductor circuits.

Moreover, as for a mounting position of the electronic circuit, it is desirable to mount the electronic circuit in the central portion or outer circumferential portion from the viewpoint of stability of the interface and disk. Nevertheless, if the stability of the disk is maintained, the electronic circuit can be mounted on another location.

(Power Source)

In FIG. 2, the power source 24 can be a battery or an air cell generating electric power by itself through a chemical change and the like from its inside, or a device receiving energy from an external power source. In the case of receiving energy from the external power source, a system for receiving energy directly by a contact, a power source receiving energy through sound, light, radio waves, induction, or the like, or to be combination thereof may be used. Furthermore, a system transmitting: and receiving a signal superimposed on a supply voltage may be used. Moreover, the power source 24 can be used not only as a power source for each electronic circuit mounted on the electronic-circuit-mounting surface 20, but also, for example, a power source for an external apparatus, in case of the ID 2 operating as a main controller of the external system. In this case, the ID 2 can play a role as a "certification card" permitting use of the external system. On the contrary, if the supply voltage is supplied from the main fame of the system, the power source 24 is not necessary on the ID 2.

(Interface)

In FIG. 2, numeral 27 is a communication path for communicating between the control block and a data processor 11 of the external apparatus 100 via the interface 26 of the control block mounted on the electronic-circuit-mounting surface 20, and also an interface signal line connecting the interface 26 and data processor 11. A signal over the interface signal lines 27 can be direct signals over a bus 25 as it is, or signals modified, transformed, amplified, modulated, or demodulated. Of course, it can be signals parallel to-serial-converted or serial-to-parallel-converted, or signals for serial/parallel communication or for metaparallel operation (a communication path has a bit width larger than that of a bus), or signals to which an error-correcting code is added.

In addition, as for a signal over the interface signal lines 27, it is desirable that electrical connection conditions such as an electric signal and timing, and mechanical and structural connection conditions, which are hardware-related, and processing conditions, methods, protocols, which are software-related, are standardized or normalized. In particular, as for protocols, it is desirable that the physical layer and/or the logical layer are standardized. Furthermore, as the interface signal lines 27, a contact type of line and a non-contact type of line are conceivable. In particular, in this embodiment, since read from/write to the information recording surface 30 is performed with light, it is technically advantageous to adopt an interface using light, radio waves, or induction of the non-contact type.

(Information Recording Surface)

The information recording surface 30 in FIG. 2 is a surface storing information of the ID 1 of this embodiment, for example, a single surface of an optical disk. It is apparent that the form for storing information on the information-recording surface 30 can be a form in which the information is stored by pit shape recording, magneto-optic recording, or recording by changing memory pigment. The information on the optical disk is read or written by a read/write signal 31 by the optical disk controller 10. The optical disk controller 10 of this embodiment can perform read/write on an ordinary optical disk if the ordinary optical disk such as a compact disk, a magneto-optical disk, or a DVD is inserted.

In addition, in FIG. 2, the read/write signal 31 shows that the optical disk controller 10 optically reads information from the information recording surface 30 of the ID 2. Numeral 12 shows a signal line, which transmits, to the data processor 11, the information that is stored in and read from the information-recording surface. The line can be a bus signal line of the data processor 11 or an input/output bug. In addition, although this is not shown, it is acceptable to have information-recording surface as a part of the electronic-circuit-nounting surface 20. Furthermore, although the electronic circuit, power source, interface, information recording surface, and the like are described as being part of the information storage medium, it is apparent that a part of them, as described above, can be present on a part dot shown that includes the in formation storage medium.

<Example of System Using Storage Medium According to this Embodiment>

Next, an example of a system using a storage medium according to this embodiment and an example of operation of an electronic circuit mounted on the electronic-circuit-mounting surface 20 will be described.

This is an example where the data processor 11 (or the external apparatus 100) is treated and controlled as a peripheral from the viewpoint of the ID 2 in FIG. 2 by standardizing the interface with the surrounding hardware (it does not matter that, inside respective surroundings of hardware, a system program or a microprogram is executed) instead of a standard input/output system (BIOS) of a conventional system program (OS). More minutely, this is an example where the data processor is connected as a peripheral unit of the electronic circuit of the ID 2. In this case, the ID 2 is connected to the data processor 11 as a peripheral (or the external apparatus 100) via the interface signal lines 27 by the interface 26. In this case, universal connection becomes possible by, as described above, standardizing or normalizing the connection conditions between the ID 2 and data processor 11 or external apparatus 100, in hardware (electrical connection conditions such as an electric signal and timing), mechanics (mechanical and structural connection conditions), and software (processing conditions, methods, protocols). Furthermore, manufacturers can mass produce the common products.

Thus, if the interface conditions of the external apparatus 100, when viewed from the ID 2, are standardized, predetermined processing is performed inside the data processor 11 in the external apparatus 100 side, which acts a peripheral, even if after peripherals are interfaced to the data processor 11. Furthermore, the external apparatus 100 can be connected to the ID 2 by predetermined interface conditions (corresponds to a BIOS that is a standard input/output system on a computer control software for peripherals) (standards, specifications). Therefore, any external apparatuses can be connected so long as these interface conditions are observed.

<Construction and Example of Operation in the Case that Interface Uses Inductive Communication>

Figure 3:
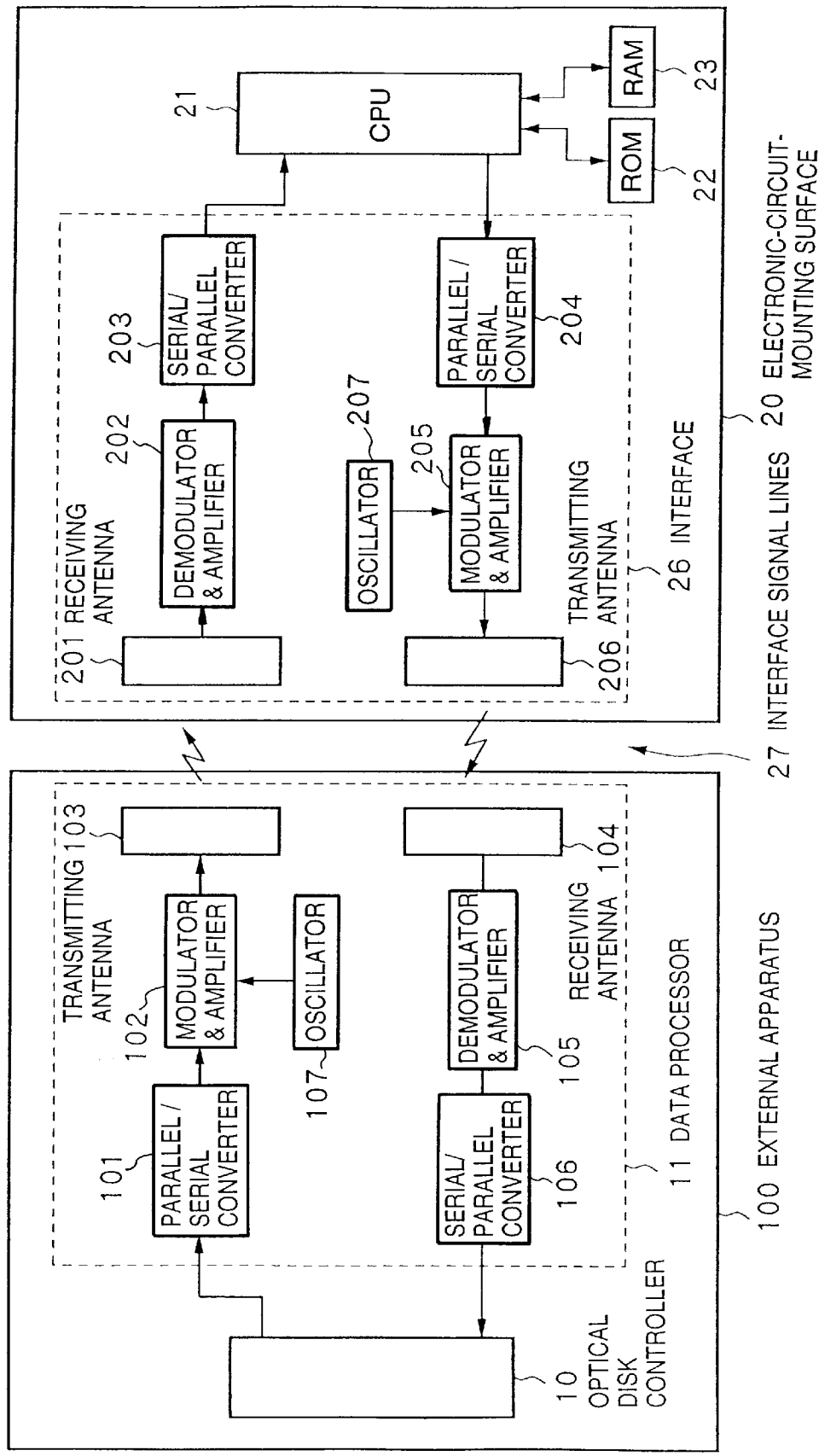
FIG. 3 is a diagram of a constructive example in such a case that an interface uses inductive communication.

More concretely, information will be described with reference to FIG. 3. FIG. 3 shows a case where induction means is used as the communication means of the interface signal lines 27. It is apparent that the interface can be constructed with communication means using optical communication means shown in FIG. 4, or communication means using sound or members for changing a light path, or electrical and/or mechanical contact.

Operation of this system of this embodiment is as follows. First, the power switch of the system is turned on, and next, ID 2 is inserted into the optical disk controller 3. The state of the ID 2 after insertion can be static, or rotating at rotational frequency defined by the external apparatus 100 or at rotational frequency not defined by the external apparatus 100. In order that the disk controller 10 of the external apparatus 100 may transmit a signal as a system startup command and read information stored in the ROM 22 built in the electronic-circuit-mounting surface 20, the following procedure is performed.

First, the disk controller 10 of the external apparatus 100 transmits an information signal as a system startup command, this information signal is converted into a serial signal in a parallel/serial converter 101 in the data processor 11. Next, a radio frequency signal outputted by an oscillator 107 built in the data processor 11 is digital-modulated (for example, ASK modulation) with the serial signal and is power amplified by a modulator and an amplifier 102. Thereafter, the amplified signal is applied to a transmitting antenna 103 of the external apparatus 100. The same signal as that applied to the transmitting antenna 103 of the external apparatus 100 is induced by electromagnetic induction in a receiving antenna 201 on the electronic-circuit-mounting surface 20.

The electronic-circuit-mounting surface 20 side detects the information signal of the system startup command sent from the transmitting antenna 103 of the external apparatus 100. Furthermore, this induced information signal is demodulated into an original serial signal by a demodulator and amplifier 202 built in the interface 26. Moreover, after this serial signal is converted into a parallel signal by a serial/parallel converter 203, the CPU 21 identifies the instruction and information, and reads ROM information from the ROM 22 according to this identification to store information in the RAM 23 according to necessity. The parallel information signal being read is converted into a serial signal by a parallel/serial converter 204 on the electronic-circuit-mounting surface 20.

On the basis of this serial signal, an output of a base clock, supplied by an oscillator 207 built in the interface 26 or the external apparatus 100 and is not shown, is digital-modulated (for example, FSK modulation) and power-amplified by a modulator and amplifier 205, the output is supplied to a transmitting antenna 206 on the electronic-circuit-mounting surface 20. This information is induced in a receiving antenna 104 of the external apparatus 100 as the same signal as the signal supplied to the transmitting antenna 206 by electromagnetic induction. This signal is demodulated and amplified by a demodulator and amplifier 105 in the data processor 11, and is restored to the original information via a serial/parallel converter 106 to be processed by the optical disk controller 10.

In this manner, startup of the system is completed by reading the startup information from the ROM 22 on the electronic-circuit-mounting surface 20. In addition, the RAM 23 is also used if necessary. Hereafter, the data processor 11 operates as a peripheral of the ID 2 on the basis of transfer of signals with the interface to mutually transfer data. Here, extended RAM and the like can be mounted in a peripheral.

(Configuration Example of Antenna)

Figure 5:
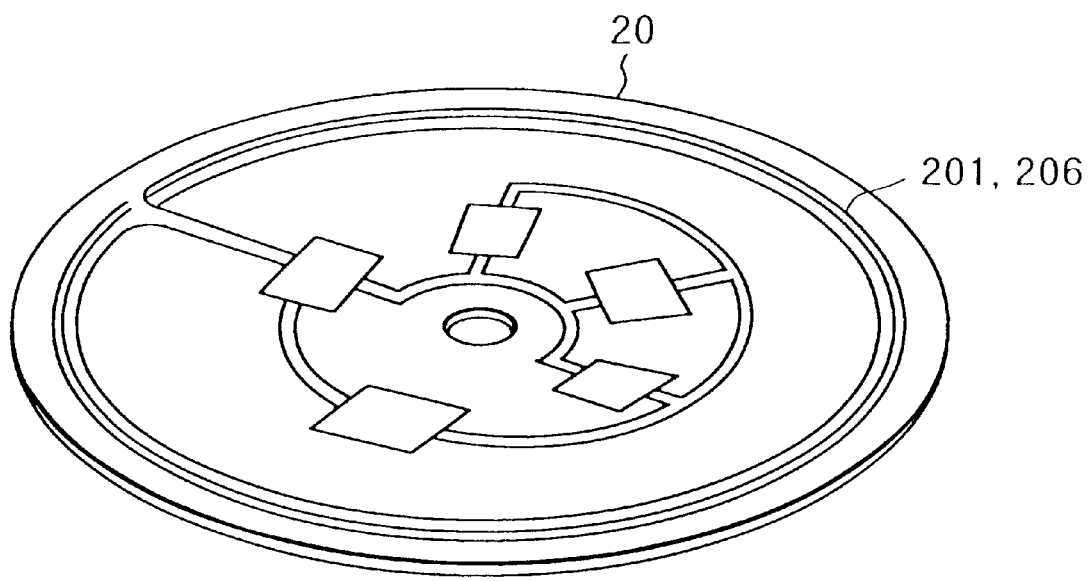
FIG. 5 is a drawing of an example of mounting an antenna on an electronic-circuit-mounting surface.

FIG. 5 shows an example of mounting the antennas 201 and 206 used in this embodiment of the present invention. In the example shown in FIG. 5, a coil which becomes the antenna is located along a circumference around the electronic-circuit-mounting surface 20, and a transceiver and various types of electronic circuits are configured and located. By configuring the antennas in this manner, it becomes easy to construct the antennas at the same time when a substrate is sputtered or etched, and hence this makes manufacturing process easier. Hence, it becomes possible to reduce cost and work force.

<Construction and Example of Operation in the Case that Interface Uses Optical Communication>

Figure 4:
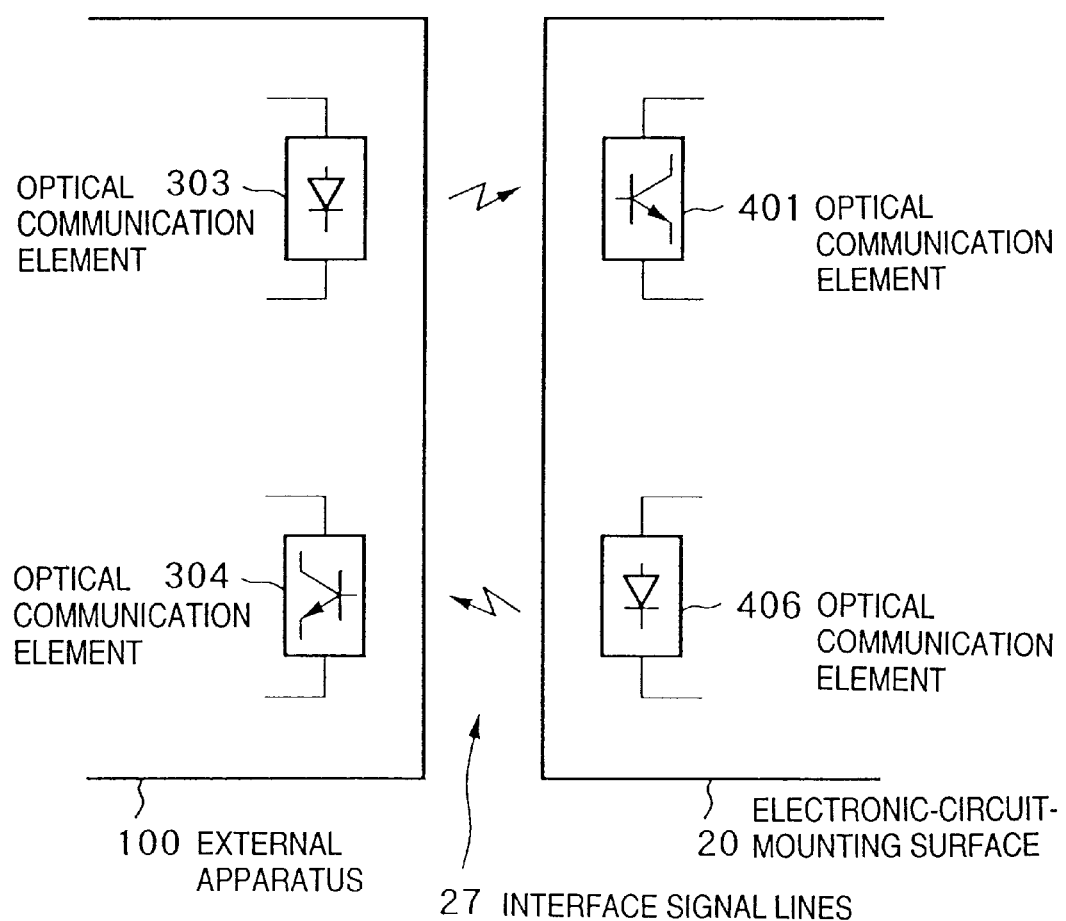
FIG. 4 is a drawing of the construction in such a case that the interface is optical communication.

FIG. 4 shows the case of using optical communication, and this is an example of using light emitting diodes for transmission and photo transistors for reception (optical communication elements), 303, 304, 401, and 406, commonly used for optical transmission and reception instead of the transmitting and receiving antennas in FIG. 5.

When digital communication is performed with light, it is general to transmit information by intermittently outputting light from the light emitting diodes as the example described above. On the other hand, it is also possible to transmit information to a photodetector by outputting light continuously, constructing such combination of paths that an output of the light may be received by the photodetector, and controlling the light path on transmission and reflection by using optical path-change members such as a liquid crystal.

In addition, it is possible to transfer information to the photodetector by changing a reflection angle by using optical path-change members that can change the reflection angle on a fine surface.

Figure 6:
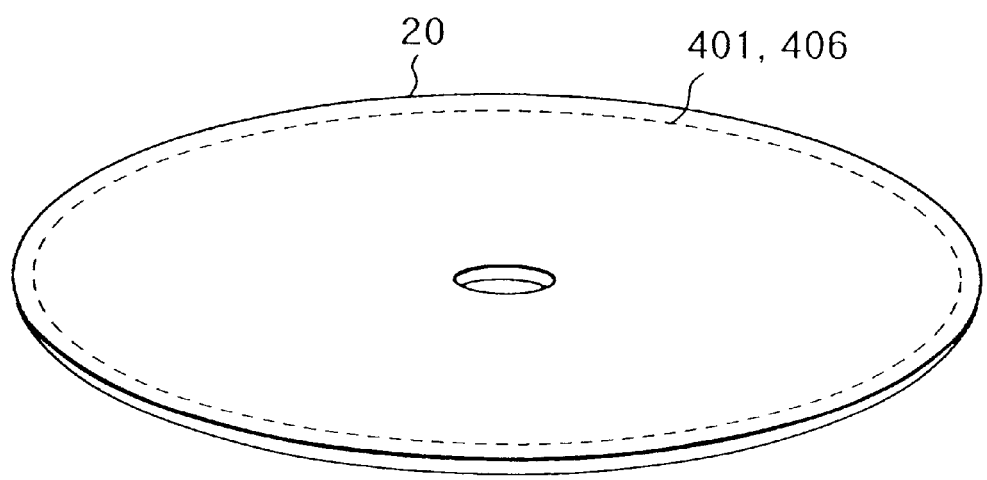
FIG. 6 is a perspective view of an elements for changing light paths are located around the circumference of an electronic-circuit-mounting surface.

FIG. 6 is a perspective view showing that the optical path-change elements are located along a circumference as shown by 406 around the electronic-circuit-mounting surface 20.

FIGS. 7A and 7B are explanatory diagrams showing operation of the optical path-change elements. FIG. 7A is explanatory diagrams where the reflection angle is changed. The left diagram of FIG. 7A shows the example of setting so that a light output may be directly reflected and the photodetector side can receive the light or cannot according to its angle of reflection. Using this, a signal is transmitted. The right-side drawing of FIG. 7A shows another example having the construction where a half mirror is inserted in the light path, and this is a modification of the example in the left diagram of FIG. 7A. FIG. 7B is explanatory diagrams of examples of using optical path-change members shielding an optical path, such as a liquid crystal. The left end drawing of FIG. 7B shows an example of transmitting a signal according to an on/off state of the optical path-change members, such as a liquid crystal, by constructing a light emitting element and a photodetector as a pair, so that the optical path can be changed by the shielding. The middle and right diagrams of FIG. 7B show examples where a signal can be sensed by reflection similar to the example shown in FIG.

7A by forming a reflection film (thick portions in diagrams) behind the liquid crystal and using the liquid crystal as a shutter before the film.

After completion of system startup, the system reads the necessary programs, such as a system program, data and the like from the information recording surface 30 via the optical disk controller 10, signal lines 12, and data processor 11. Furthermore, the system performs processing and modification of data, in case of necessity, and synthesizes the data or information with the data or information, which is stored in the ROM 22 and RAM 23, via the interface signal lines 27 and interface 26, in case of necessity. Moreover, the system refers to a table, in case of necessity, to generate a control signal and data and transmits them as a control signal or data to the data processor 11, and stores them in the RAM 23 or extended RAM, in case of necessity, to start system processing. It is not necessary to restrict the external apparatus 100 including the data processor 11, and hence the external apparatus 100 can be video equipment, display unit, and the like. In addition, although communication between the external apparatus 100 and ID 2 is described to be performed at the shortest distance, the ID 2 can communicate with an external apparatus separating over the shortest distance.

Hereafter, a preferable embodiment, in the case that the above-described interface is performed with electromagnetic coupling caused by balanced microstrip lines, will be described in detail.

<Summary of Balanced Microstrip Lines on Non-contact Type of Rotating Medium of this Embodiment>

Figure 8:
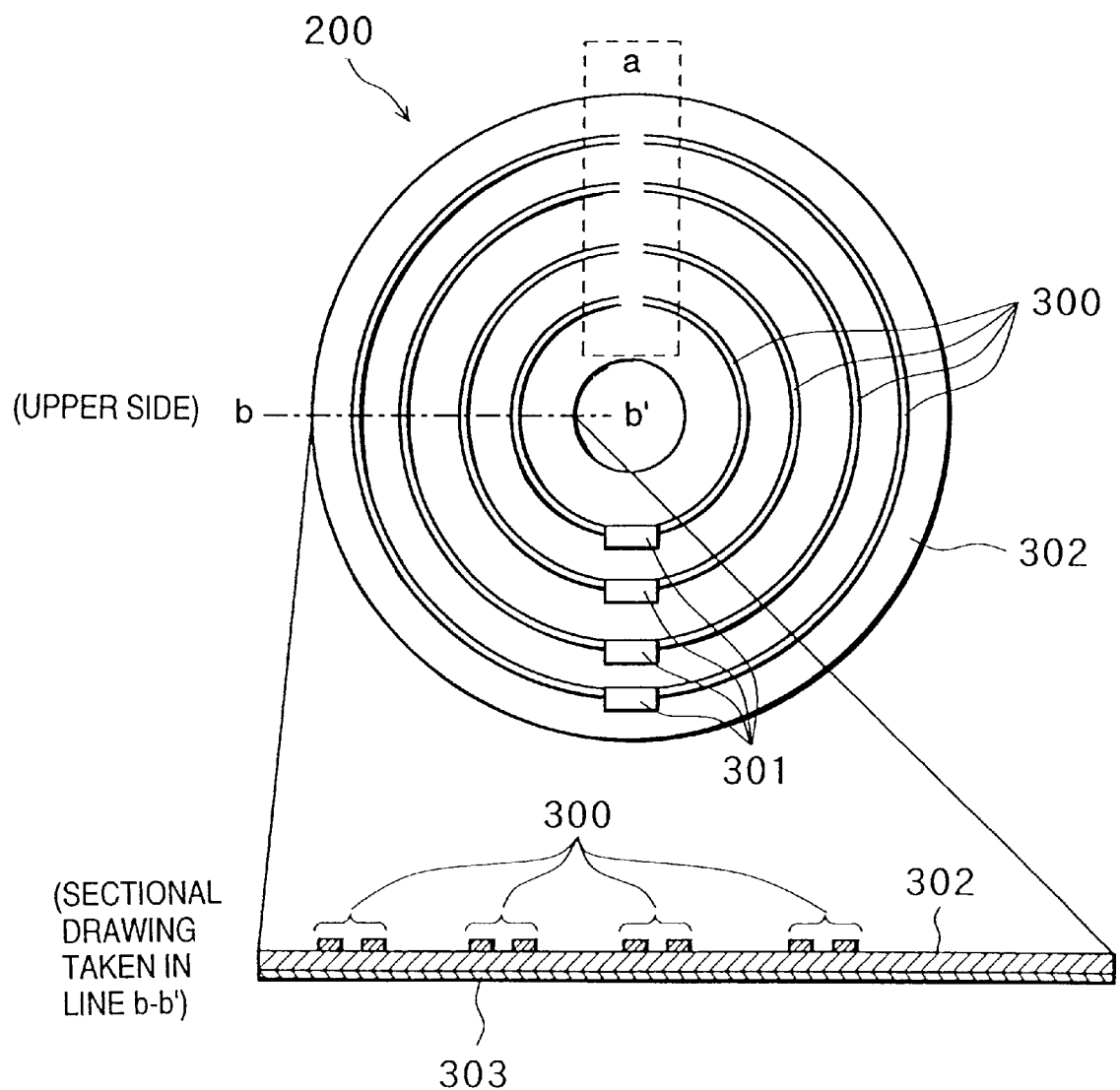
FIG. 8 is a drawing of a constructive example of balanced microstrip lines of this embodiment.

FIG. 8 shows an example of a construction of balanced microstrip lines on a non-contact type of rotating medium 200, and a sectional view taken on line b–b' are shown.

In the drawing, numeral 300 shows balanced microstrip lines constructing antennas, and 301 are phasers for adjusting the electrical line lengths of the balanced microstrip lines. Furthermore, numeral 302 is a dielectric substrate that form the body of the non-contact type of rotating medium by adhering or embedding the balanced microstrip lines 300, and 303 is a rigid ground plane supporting the dielectric substrate 302.

Figure 9:
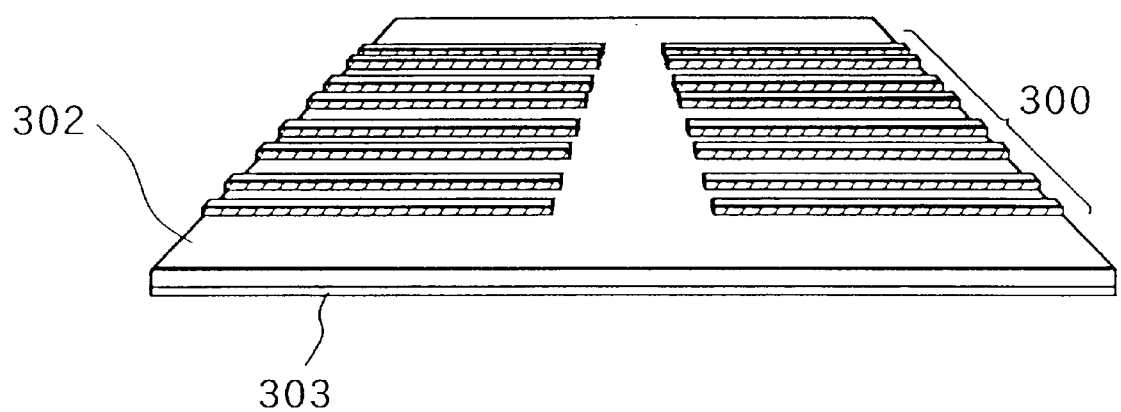
FIG. 9 is a perspective view of a part cut with a region "a" in FIG. 8 with viewing from a lower side.

FIG. 9 is a perspective view of a part cut of a region "a" in FIG. 8 by viewing from a lower side.

FIG. 9 shows an example where the balanced microstrip lines 300 are formed on the dielectric substrate 302 located on the ground plane 303.

Figure 10:
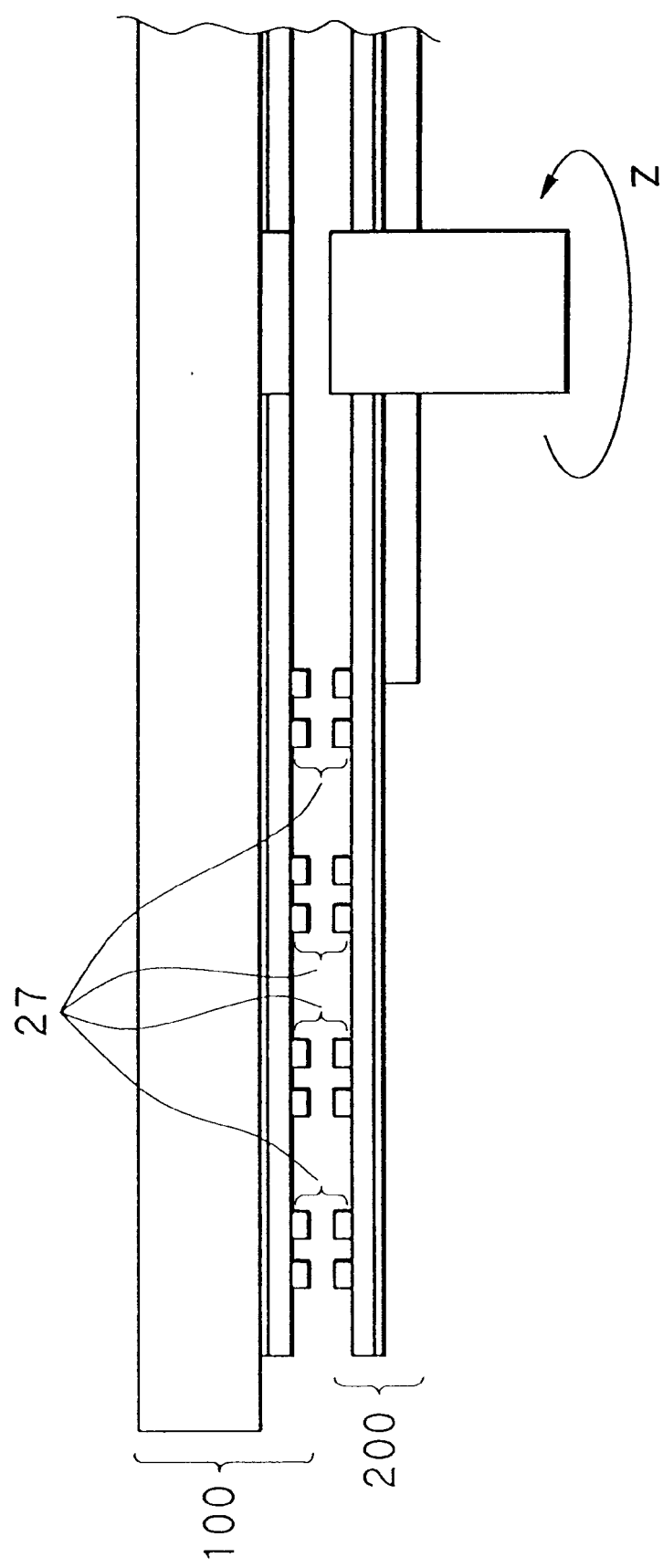
FIG. 10 is a drawing of a state where an antenna of a non-contact type of rotating medium 200 faces an antenna of an external apparatus 100.

FIG. 10 is a drawing showing relation of interface signal lines 27 (wireless) actually formed in a case of a non-contact type of rotating medium 200 where the balanced microstrip lines are constructed are mounted in a drive unit. In FIG. 10, only the balanced microstrip lines are of particular interest, and hence other parts are omitted.

FIG. 10 is expressed in correspondence to the section b–b' in FIG. 8, and hence, FIG. 10 shows relation between the non-contact type of rotating medium 200 and external apparatus 100 at the time of the non-contact type of rotating medium 200 rotating, for example, in the z direction.

Figure 11:
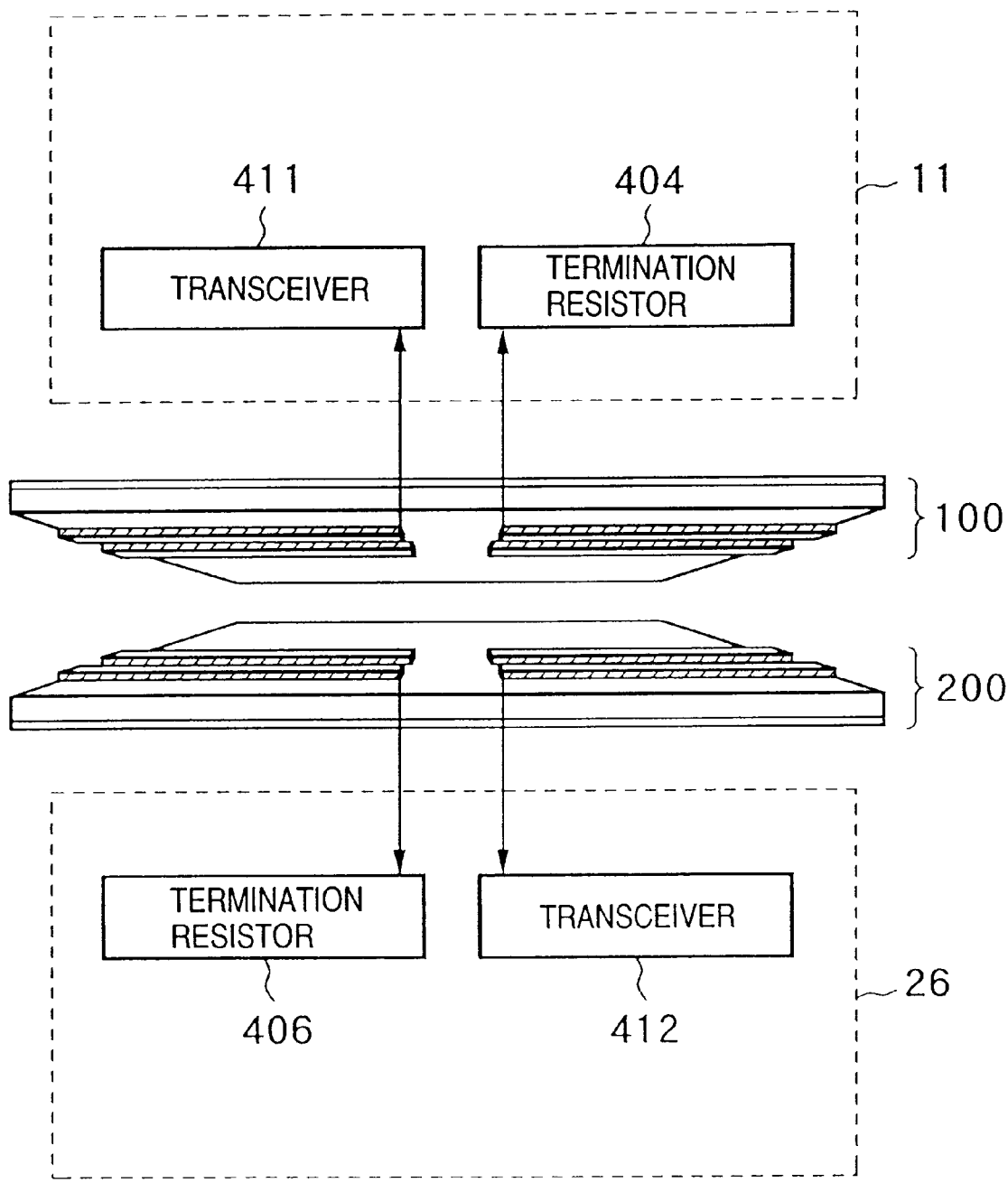
FIG. 11 is a perspective view of a part cut with a region "a" in FIG. 8 with viewing from a lower side in the state in FIG. 10.

FIG. 11 is a perspective view showing relation between a part cut of a region "a" in FIG. 8 and the external apparatus 100 while paying attention to only the balanced microstrip lines, where the non-contact type of rotating medium 200 and where the balanced microstrip lines are constructed and mounted in a drive unit.

For termination of the balanced microstrip lines of the non-contact type of rotating medium 200, predetermined processing is performed in the interface 26. Thus, one end of the balanced microstrip lines of the non-contact type of rotating medium 200 is connected to a termination resistor 406, and another end is connected to a transceiver 412. In addition, as to the external apparatus 100, predetermined processing is also performed in the data processor 11. Thus, one end of the balanced microstrip lines of the external apparatus 100 is connected to a transceiver 411, and another end is connected to a termination resistor 404. Furthermore, connection of each element will be described later with reference to FIGS. 12 and 13.

<Concrete Example of Balanced Microstrip Lines of this Embodiment>

Conventionally, it is assumed that the gap between antennas of the non-contact type of rotating medium 200 and antennas of the external apparatus 100 is 0.5 mm, that the distance between adjacent lines is 3 mm, and that the number of respective microstrip lines is one. Furthermore, let interfering waves be N, and let waves received from a facing line be S. Its S/N ratio is nearly 24.5 dB. On the other hand, performing similar calculation on the balanced microstrip lines of this embodiment, its S/N ration is nearly 30.6 dB, and hence the balanced microstrip lines are superior by nearly 6.0 dB in S/N ratio. This corresponds to a difference of 1 mm between adjacent lines. Since the balanced microstrip lines require smaller intervals between adjacent lines if both lines need the same S/N ratio, more lines can be formed.

<Example of Communication with Balanced Microstrip Lines of this Embodiment>

Figure 12:
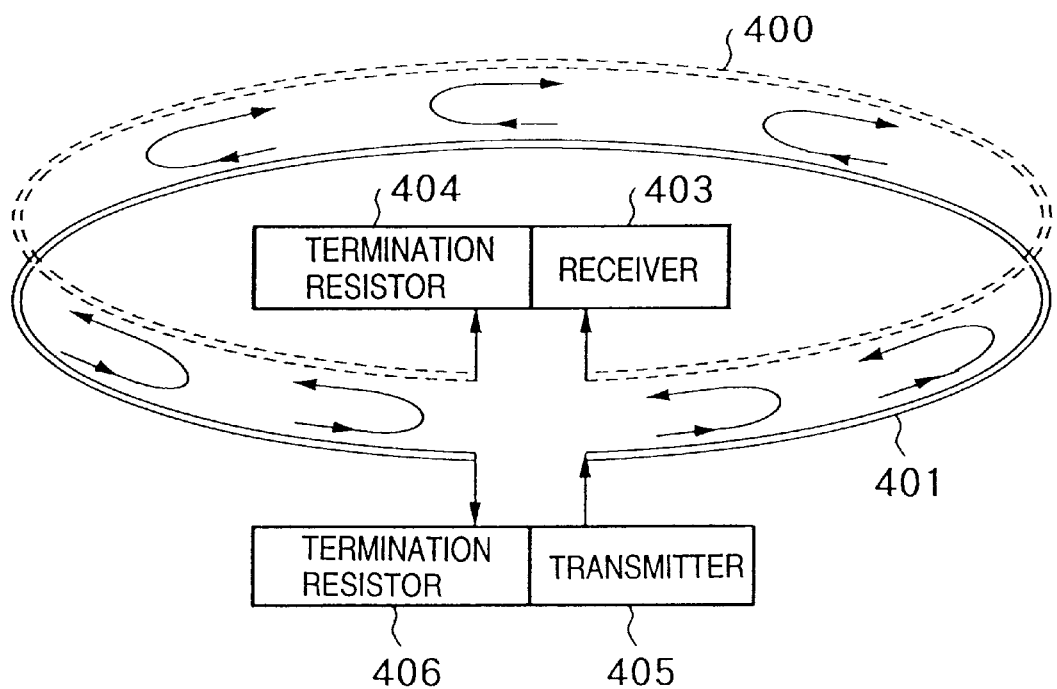
FIG. 12 is a drawing of a connection of a transmitter and a receiver to termination resistors via respective antennas.
Figure 13:
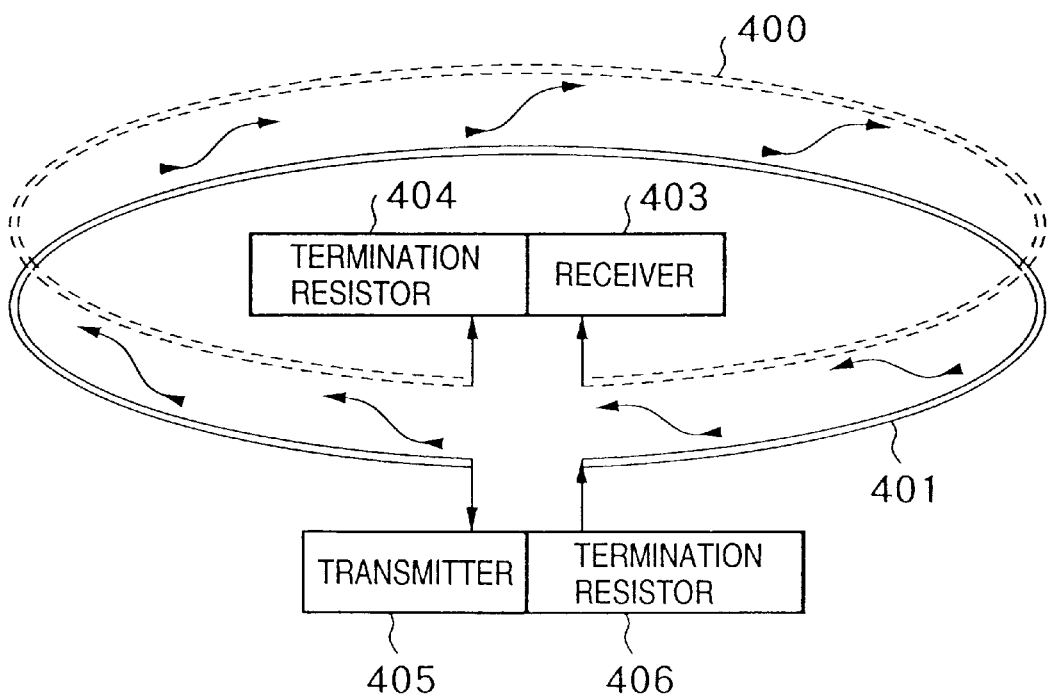
FIG. 13 is a drawing of a connection of a transmitter and a receiver to termination resistors via respective antennas.

FIGS. 12 and 13 are drawings showing communication performed by the antenna 401 on the non-contact type of rotating medium 200 facing the antenna 400 of the external apparatus 100. In FIGS. 12 and 13, the antenna 400 of the external apparatus 100 is shown by dotted lines and the antenna 401 on the non-contact type of rotating medium 200 is shown by solid lines.

As shown in FIG. 12, if the end of the antenna 401 of the non-contact type of rotating medium 200 is connected to the transmitter 405, the end of the antenna 400 of the external apparatus 100 corresponding to this is connected to the receiver 403, the other end of the antenna 401 of the non-contact type of rotating medium 200 is connected to the termination resistor 406, and the other end of the antenna 400 of the external apparatus 100 corresponding to this is connected to the termination resistor 404, signals sent from the transmitter 405 reaches the receiver 403 and are synthesized through paths different in length. In consequence, the synthesized wave becomes a set of components having different phases, and has waveform distortion to become not suitable to communication.

Then, as shown in FIG. 13, by changing connection relation of the transmitter 405 and receiver 403 to termination against respective antennas, lengths of transmission lines become equal in all parts, and hence waveform distortion does not occur.

This is the reason of the connection shown in FIG. 11.

<Example of Improvement of Balanced Microstrip Lines that is this Embodiment>

Figure 14:
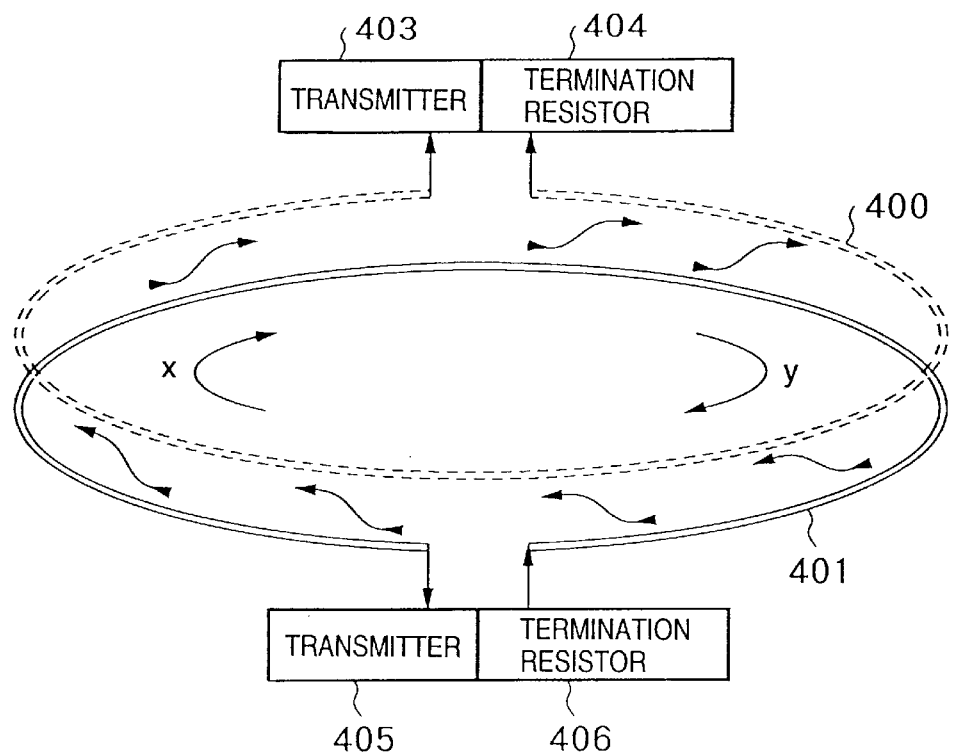
FIG. 14 is a drawing of a positional relation of dead points occurring.

Nevertheless, if the respective antennas, transmitter 405, receiver 403, and termination resistors 404 and 406 are connected as shown in FIG. 13, mutual positional relation between the antenna 401 of the non-contact type of rotating medium 200 and the antenna 400 of the external apparatus 100 becomes 1800 as shown FIG. 14. In this case, with respect to the electrical line length from the transmitter 405 to the receiver 403, the electrical line length in the y direction is longer than that in the x direction by a full line length, and the signals are synthesized in the receiver 403.

Therefore, since phase difference of a component coming from the x direction and a component coming from the y direction is 180° at harmonic frequencies of the frequency λ/2 of which is equal to full line length, they cancel each other, and hence dead points occur.

Therefore, if the frequency to be used coincides with the frequency generating the dead points, level fluctuation due to rotation occurs, making it not suitable to signal transmission.

Figure 15:
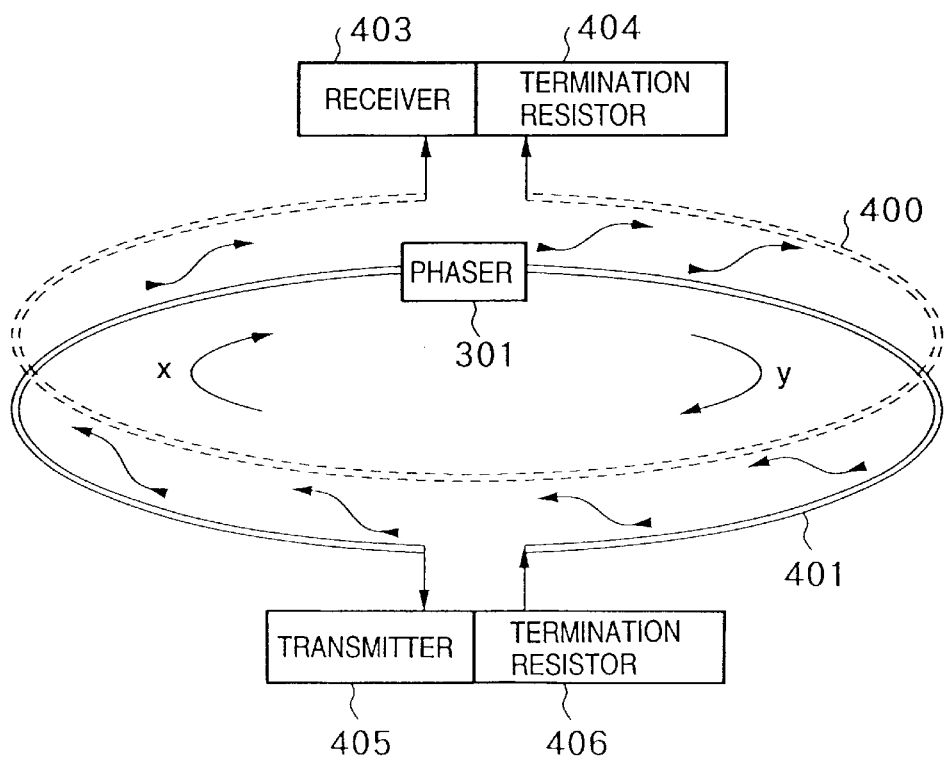
FIG. 15 is a drawing of compensation by inserting phasers in the midpoints of balanced microstrip lines.

By adjusting phasers through inserting phasers 301 as shown in FIG. 15 in the midpoints of either of balanced microstrip lines on the non-contact type of rotating medium 200 and external apparatus 100 or both of them, the virtual electrical line lengths of the microstrip lines are changed. Hence, positions of the dead points are shifted, and hence it becomes possible to communicate by using desired signal frequency.

<Example of Application of Balanced Microstrip Lines that is this Embodiment>

Balanced microstrip lines of this embodiment are used for an antenna system for performing data communication with a non-contact rotating medium, and provide an antenna system for a radio communication instrument that has small signal distortion due to rotation of the rotating medium and makes very high-speed data communication possible. Thus, the balanced microstrip lines of this embodiment are optimal for performing data communication between a general rotating medium and an external apparatus while being in non-contact. In particular, this is suitable to non-contact type of data communication for a system where an electronic circuit such as a microprocessor is mounted on a rotating medium such as a DVD and an optical disk that is a storage medium in a CD system.

<Example of Other Interface>

Figure 16:
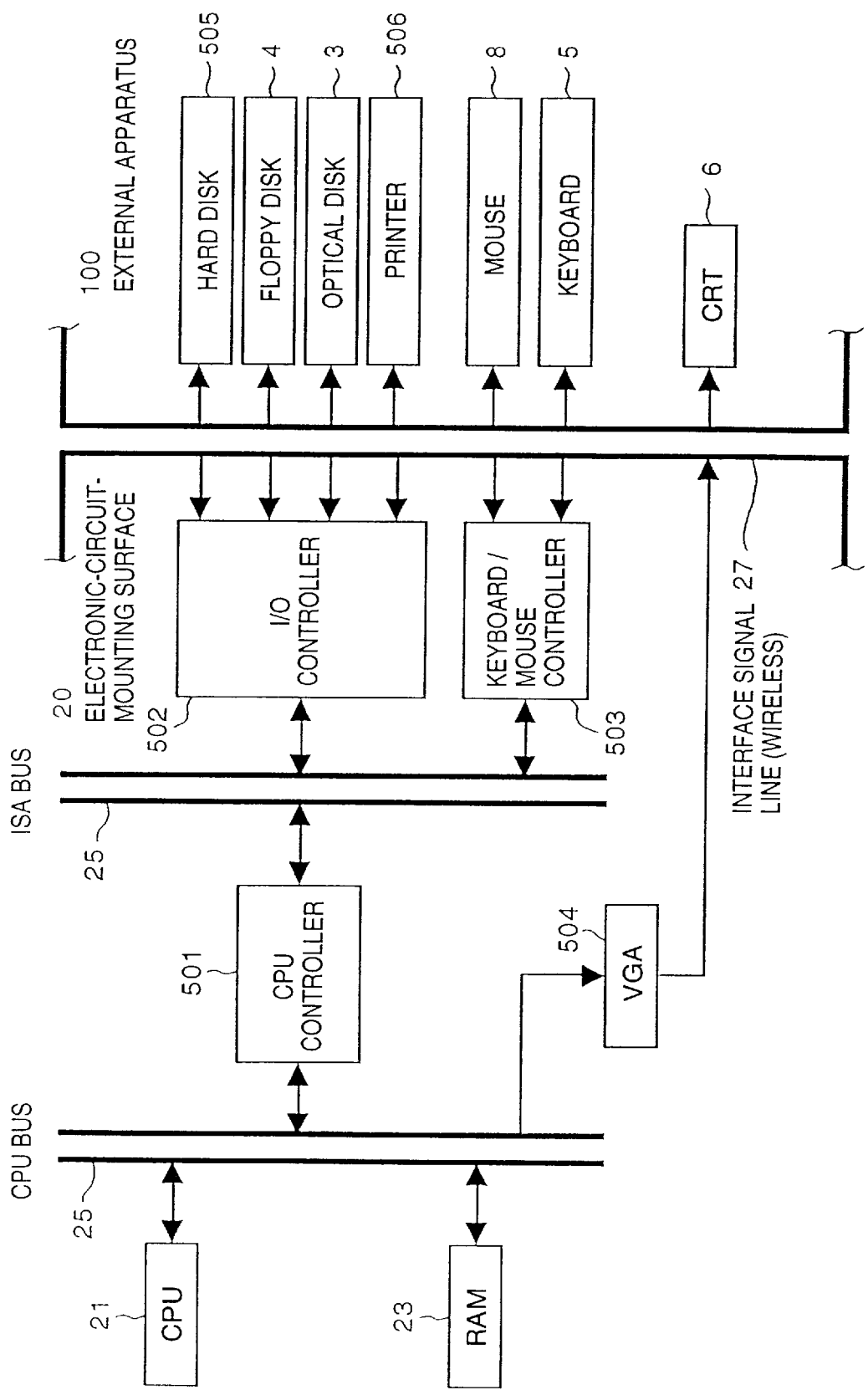
FIG. 16 is a diagram of another constructive example in such a case that an interface uses inductive coupling for communication.

Hereinbefore, although the interface signal lines 27 (wireless) between the data processor 11 and interface 26 are described as the data bus lines, these are not limited to this. As an application example, as shown in FIG. 16, a method of making the interface signal lines 27 an interface with the external apparatus 100 will be described below.

By making communication between a hard disk unit 505, the floppy disk unit 4, optical disk unit 3, and a printer 506 that are external apparatuses, and an I/O controller 502 in the electronic-circuit-mounting surface 20, between the mouse 8/keyboard 5 and a keyboard/mouse controller 503 in the electronic-circuit-mounting surface 20, and between the display unit 6 and a video graphic array 504 in the electronic-circuit-mounting surface 20 radio communication, this example is made to have a plurality of communication lines.

In addition, it is natural that, as described above, processing and technology such as serial/parallel conversion, parallel/serial conversion, band compression, optimum communication protocol, addition of an error correction code are used in respective communication lines (interface signal lines) 27. In addition, as shown in FIG. 16, communication lines can be used independently by respective units, and can be constructed so that, for example, the mouse 8 and keyboard 5 may share one communication line. Furthermore, a hard disk and the like can use a plurality of communication lines. Thus, according to objectives and construction of the external apparatus 100, with considering data transfer capacity and data transfer timing, limited communication lines can be effectively distributed for use. Therefore, it is conceivable to dynamically change distribution of the communication lines.

Hereinbefore, after completion of system startup, the system reads necessary programs such as a system program, information, data and the like from the information recording surface 30 via the optical disk controller 10, signal lines 12, and data processor 11. Furthermore, the system performs processing and modification of data in case of necessity, and synthesizes the data with the data or information, which is stored in the ROM 22 and RAM 23, via the interface signal lines 27 and interface 26 in case of necessity. Moreover, the system refers to a table in case of necessity to generate a control signal and data and transmits them as a control signal or data to the data processor 11, and stores them in the RAM 23 or extended RAM in case of necessity to start system processing. Here, it is not necessary to restrict the external apparatus 100 including the data processor 11, and hence the external apparatus 100 can be video equipment, display unit, and the like.

This embodiment, as described above in detail, reduces loads of the main-frame of the system in processing of information stored in a information storage medium by constructing communication means between the ID 2, which comprises a storage medium and an electronic circuit suitable to the storage medium that are in one-piece, and the external apparatus with balanced microstrip lines. Furthermore, according to this embodiment, the ID 2 can be used as an apparatus, which has intelligence that can manage and control external system equipment and transfers information with the storage medium and electronic circuit, and an apparatus that is included in a system including the former apparatus and includes communication means.

Hereinbefore, the present invention is described with preferred embodiments. Nevertheless, the present invention is not limited to the above-described embodiments and various changes, additions, and modifications can be made within the spirits and scope as set out in the accompanying claims.

What is claimed is:

1. A storage medium that has an electronic circuit mounted on at least a part of the storage medium,
    wherein the electronic circuit has communication means for communicating with an external device, the communication means has an interface comprising a plurality of balanced microstrip lines formed in concentric circles centering on a rotating shaft in predetermined intervals on a surface of the storage medium, and the plurality of balanced microstrip lines perform transmission of a plurality of signals corresponding to a number of balanced microstrip lines.

2. The storage medium according to claim 1, wherein said interface is an interface that is standardized beforehand physically and/or logically.

3. The storage medium according to claim 1, wherein said storage medium includes one of a magnetic disk, a magnetic card, an optical disk, an optical card, and a magneto-optical card.

4. An apparatus performing information transfer with an electronic circuit of a storage medium that has the electronic circuit mounted on at least a part of the storage medium, wherein the electronic circuit has communication means for communicating with said apparatus, the communication means has a first interface comprising a plurality of first balanced microstrip lines formed in concentric circles centering on a rotating shaft in predetermined intervals on a surface of the storage medium, and wherein said apparatus has a second interface with the communication means, said second interface comprising a plurality of second balanced microstrip lines formed in concentric circles in predetermined intervals facing toward said first interface of the storage medium, and the plurality of a first and second balanced microstrip lines performing transmission of plurality of signals corresponding to the number of first and second microstrip lines.

5. The apparatus according to claim 4, wherein said interface is an interface that is standardized beforehand physically and/or logically.

6. The apparatus according to claim 4, wherein said storage medium includes one of a magnetic disk, a magnetic card, an optical disk, an optical card, and a magneto-optical card.

7. A system composed of a storage medium, which has an electronic circuit mounted on at least a part of the storage medium, and an apparatus performing information transfer with the electronic circuit, wherein the electronic circuit has communication means for communicating with said apparatus, and said communication means and said apparatus have an interface, said interface comprising a plurality of pairs of balanced microstrip lines, each pair corresponding to each of transmission signals, in which a plurality of balanced microstrip lines on a surface of the storage, medium respectively are formed in concentric circles centering on a rotating, shaft in predetermined intervals, and a plurality of balanced microstrip lines in the apparatus respectively are formed in concentric circles in predetermined interval facing toward said plurality of balanced microstrip lines of the storage medium, and the plurality of pairs of balanced microstrip fines perform transmission of the plurality of signals corresponding to the number of pairs of balanced microstrip lines.

8. The system according to claim 7, wherein said interface is an interface that is standardized beforehand physically and/or logically.

9. The system according to claim 7, wherein said storage medium includes one of a magnetic disk, a magnetic card, an optical disk, an optical card, and a magneto-optical card.

10. A radio signal transmission apparatus, wherein balanced microstrip lines are used as an antenna for a radio communication so as to avoid interference with adjacent lines and to increase density of signal transmission channels of signal transmission lines on a surface, each signal transmission channel comprising a pair of balanced microstrip lines in which a balanced microstrip line on a surface of a storage medium is formed in concentric circle centering on a rotating shaft, and a balanced microstrip line in an external apparatus is formed in concentric circle facing toward said balanced microstrip line of the storage medium.

11. The radio signal transmission apparatus according to claim 10, wherein one of a transmitter and a receiver, and a termination resistor are connected at both ends of each of said balanced microstrip lines on the rotating medium and the fixed balanced microstrip lines, and connection ends of the one of transmitter and receiver, and termination resistor are selected so that inductive directions on balanced microstrip fines coincide.

12. The radio signal transmission apparatus according to claim 10, wherein fixed or variable phasers adjusting electrical line lengths are provided at midpoints of the balanced microstrip lines.

13. A non-contact type of rotating medium having communication means for communicating with an external device, wherein a plurality of balanced microstrip lines are formed in con centric circles centering on a rotating shelf in predetermined intervals on a surface of the rotating medium as a part of an antenna, and the plurality of balanced micro-strip lines preform transmission of a plurality of signals.

14. The non-contact type of rotating medium according to claim 13, wherein a transmitter and/or a receiver, and a termination resistor are connected at both ends of said balanced microstrip lines.

15. The non-contact type of rotating medium according to claim 14, wherein fixed or variable phasers adjusting electrical line lengths are provided at the midpoints of the balanced microstrip lines.

16. The non-contact type of rotating medium according to claim 13, wherein said non-contact type of rotating medium is a storage medium having an electronic circuit.

* * * * *